United States Patent [19]

MacGuire

[11] 4,172,438
[45] Oct. 30, 1979

[54] VALVE DEVICE AND SYSTEM EMPLOYING SAME

[75] Inventor: Andrew E. MacGuire, Ontario, Canada

[73] Assignee: The Ferry Cap & Set Screw Company, Cleveland, Ohio

[21] Appl. No.: 889,969

[22] Filed: Mar. 24, 1978

[51] Int. Cl.$^2$ .................................. F02M 25/06
[52] U.S. Cl. ........................... 123/124 R; 123/97 B; 123/119 C; 123/119 D; 123/141; 137/480; 261/DIG. 19; 261/44 D
[58] Field of Search ....... 123/119 D, 119 DB, 124 R, 123/124 A, 124 B, 97 B, 119 B, 119 C, 141; 137/480, 525, 539; 261/DIG. 19, 44 C, 44 D, 56

[56] References Cited

U.S. PATENT DOCUMENTS

| | | | |
|---|---|---|---|
| 3,364,909 | 1/1968 | Mick | 123/103 R |
| 3,693,650 | 9/1972 | MacGuire | 123/119 D |
| 3,799,132 | 3/1974 | MacGuire | 123/119 D |
| 3,913,541 | 10/1975 | Scott, Jr. | 123/119 D |
| 4,024,846 | 5/1977 | MacGuire | 123/119 D |

Primary Examiner—Wendell E. Burns
Attorney, Agent, or Firm—Maky, Renner, Otto & Boisselle

[57] ABSTRACT

Valve device includes a valve chamber containing three spherical members of different hardnesses in stacked relation therein, which produce a limited pulsating air flow that is metered in precise amounts at any given time into the fuel/air path of a gasoline powered internal combustion engine to maintain a narrow band air/fuel ratio over substantially all operating modes. The valve chamber has relatively narrow entry and exit orifices in order to increase the velocity of the pulsations generated therein while at the same time reducing the amount of supplemental air flow through the device. The valve seat also has a conical shape to establish line contact with one of the spherical members to assist in obtaining maximum resonation during operation and provide a more positive seal when the engine is not running. The pulsating air from the valve device is preferably introduced into the carburetor beneath the throttle plate in close proximity below the gas idle jets, providing pressure waves therein that produce turbulence substantially throughout the manifold to assist in remixing and atomizing of the fuel and air, whereby substantially equal air/fuel ratio is supplied to every cylinder for better fuel combustion, with consequent increased power, reduced exhaust pollution, and improved fuel economy.

33 Claims, 8 Drawing Figures

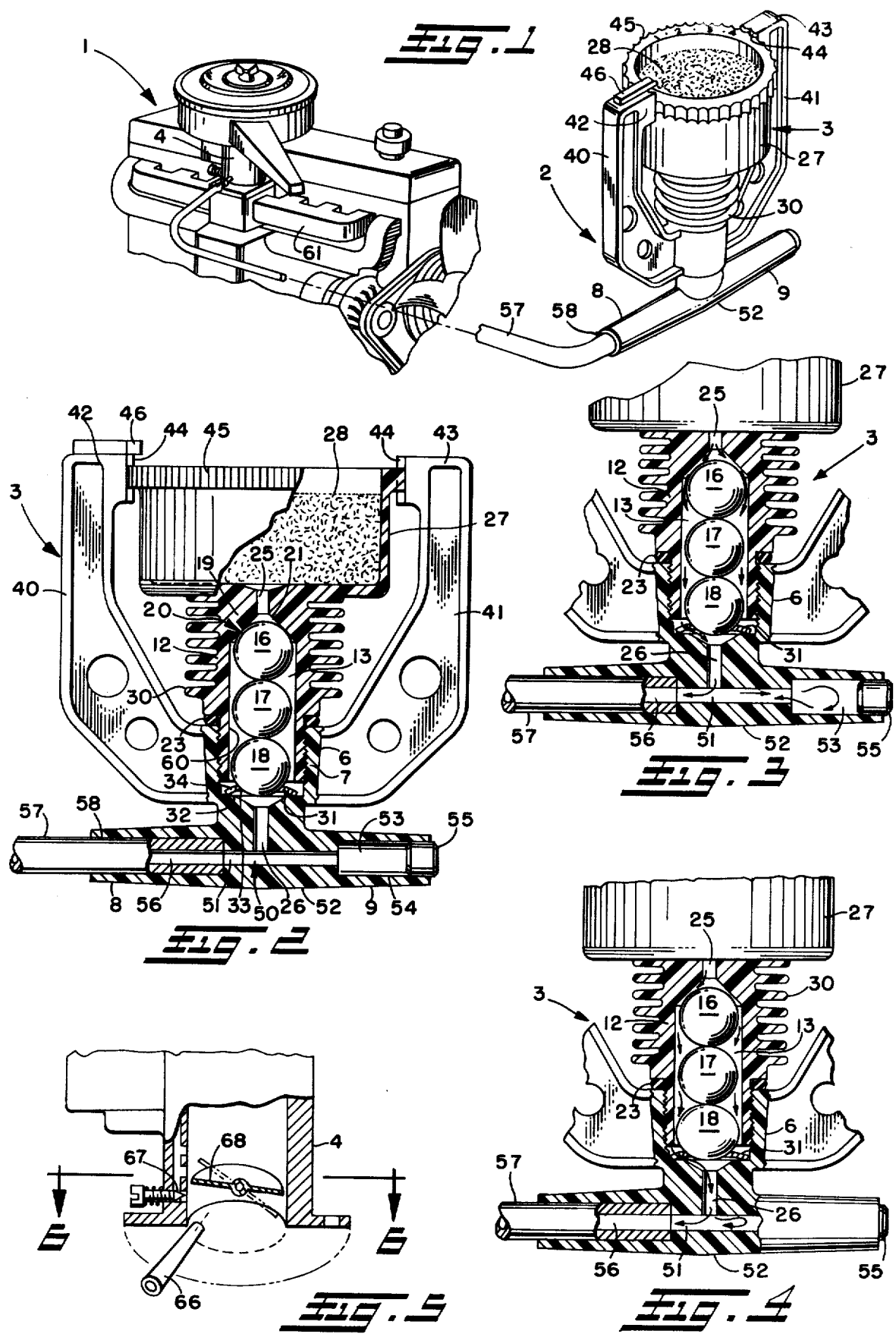

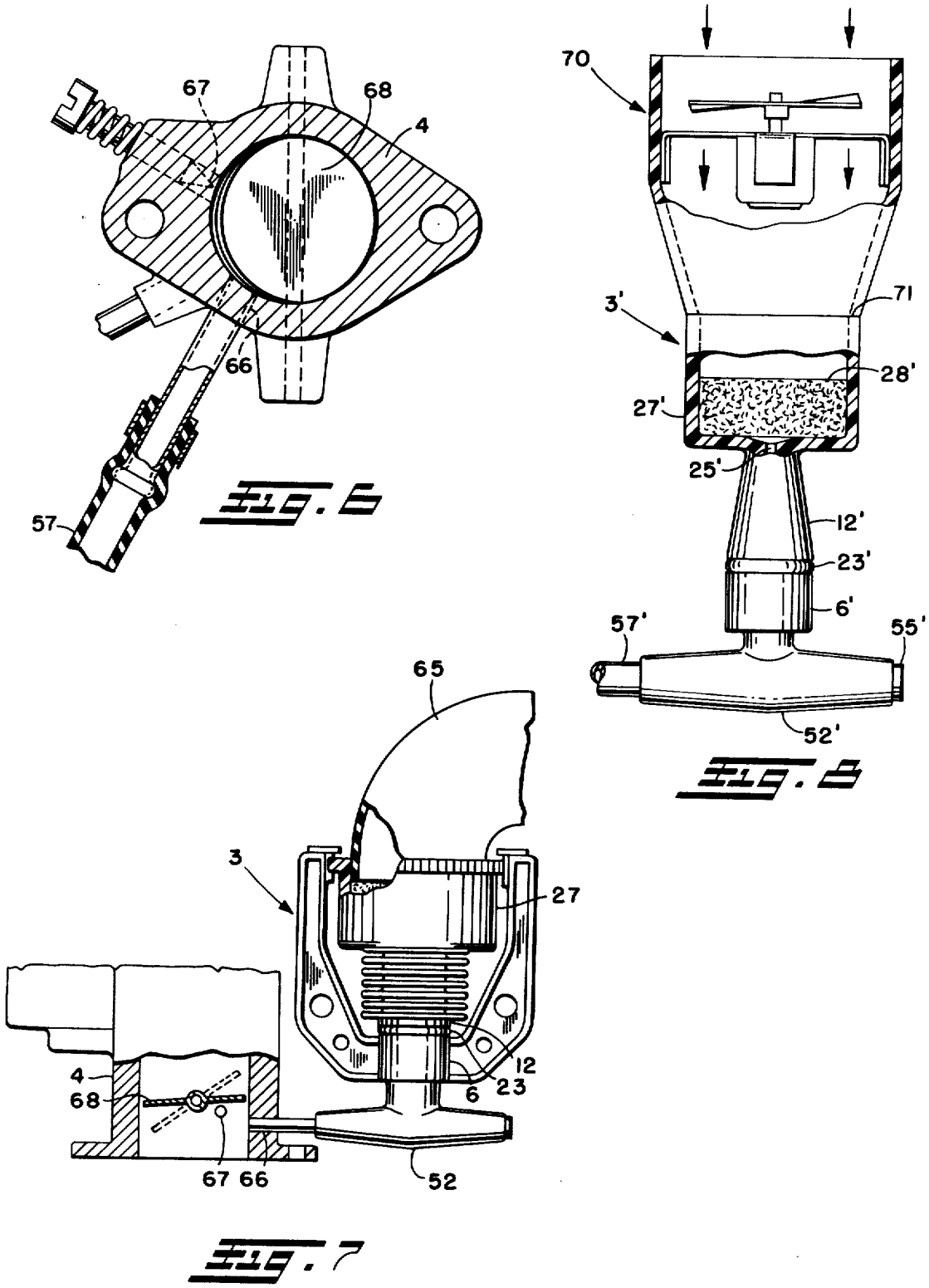

VALVE DEVICE AND SYSTEM EMPLOYING SAME

CROSS-REFERENCE TO RELATED PATENTS

This application relates to certain improvements in valve devices and systems employing same especially of the type disclosed in U.S. Pat. Nos. 3,693,650, 3,799,132, and 4,024,846, granted Sept. 26, 1972, Mar. 26, 1974, and May 24, 1977, respectively.

BACKGROUND OF THE INVENTION

The modern automotive internal combustion engine has been recognized as a principal contributor to atmospheric pollution. Devices of various sorts have been developed to control release of crankcase emissions and remove harmful products from the exhaust gases. However, it has long been recognized that if the engines could be made to operate so that substantially complete combustion of the engine fuel occurred under all operating conditions, not only would the amount of objectionable pollutants be substantially reduced, the power output of the engine and fuel economy would be increased.

In order to achieve maximum power output or the best fuel economy from an internal combustion engine, the proper fuel/air ratio, by weight, must be maintained. A carburetor will provide an engine with the proper fuel/air ratio during a portion of the operating range, but not during all driving modes, and only for a given air density. If the fuel/air ratio is permitted to become too rich or too lean, the power output of the engine is considerably reduced. Also, the ignition timing will either be too fast or too slow and the spark plug heat range will be affected. To maintain a balance of these conditions, and secure maximum power output at a given density, the correct fuel/air ratio must be maintained.

Efforts to calibrate carburetors lean enough to meet the required levels of hydrocarbons, carbon monoxide, and nitrogen oxide have not been entirely satisfactory, since as the mixture ratio is made leaner, the cylinder-to-cylinder mixture distribution becomes increasingly sensitive. This may result in an excessively lean condition in some of the cylinders, causing misfiring and raw fuel to pass through the engine, increasing the HC level and reducing engine efficiency, power, and fuel economy.

Substantially improved results have been obtained with the valves and air supply systems of the aforementioned MacGuire U.S. Pat. Nos. 3,693,650, 3,799,132, and 4,024,846 which supply air pulsations to the engine manifold of an internal combustion engine over substantially the entire speed range of the engine for improved engine response and acceleration. Such valves and systems provide automatic adjustment to various throttle settings and rates of acceleration or deceleration, which in the past have commonly resulted in a temporary improper fuel/air mixture, and prevent the emission of excessive pollutants to the atmosphere, particularly carbon monoxide and hydrocarbon vapors.

When properly adjusted, the valves can be made to resonate over the full operating range of the engine, that is, during idle as well as during cruising and acceleration and deceleration. As the valves resonate, air pulsations are created causing turbulence in the air flow passing through the valves and into the carburetor where pressure waves are set up in the lower part of the carburetor and manifold. These pressure valves assist in breaking up the fuel into smaller, more uniform particle sizes in addition to maintaining a more constant air/fuel mixture over the full operating range, for improved combustion, efficiency, fuel economy, and lower exhaust emissions.

SUMMARY OF THE INVENTION

The valve device of the present invention is of the same general type as that disclosed in the aforementioned U.S. Pat. Nos. 3,693,650; 3,799,132; and 4,024,846, but includes certain additional improvements which permit an even narrower band air/fuel ratio to be maintained over substantially all operating modes of the engine. The velocity and range of frequency of the air pulsations are increased while at the same time the amount of supplemental air flow through the device is reduced. The pulsating air from the valve device is introduced into the fuel/air path of the engine in such a manner and at such location that substantially equal air/fuel ratio is fed to every cylinder of the engine for better fuel combustion, increased power, reduced exhaust pollution, and improved fuel economy.

These and other objects of the present invention are achieved by providing three spherical members of different hardnesses in stacked relation within the valve chamber. The spherical members create a limited pulsating air flow that is metered in precise amounts at any given time into the fuel/air path of the engine. The velocity and range of frequency of the pulsations are increased while at the same time the amount of supplemental air flow through the device is reduced by providing the valve device with narrow entry and exit orifices. The valve seat is also preferably conical to establish line contact with one of the spherical members to assist in obtaining increased resonation during operation and provide a more positive seal when the engine is not running.

The volume of the pulsating air flow through the valve device is substantially the same over the full operating range of the engine, except during deceleration when the air flow through the valve device is somewhat reduced, but the velocity is increased during deceleration. Such pulsating air flow is preferably introduced into the carburetor beneath the throttle plate in close proximity below the gas idle jets, to increase the turbulence through the manifold which assists in remixing and atomizing the fuel, whereby substantially equal air/fuel ratio is supplied to every cylinder for better fuel combustion, with consequent increased power, reduced exhaust pollution, and improved fuel economy.

The high velocity air pulsations entering the carburetor and manifold, and to a lesser degree the cylinders themselves, provides an even mixture of fuel and air having substantially the same air/fuel ratio to every cylinder, whereby the overall mixture burns faster and more completely.

The velocity of the air pulsations into the engine may also be further increased by using a small diameter air line between the valve device and carburetor, and their intensity better maintained by mounting the valve device in close proximity to the carburetor to minimize the distance that the air pulsations are required to travel. In the latter event, a supply of cooler air should be provided to the valve device, as by running a hose from the valve device to the front bulkhead of the vehicle. The cooler air, being more dense, is better able to transmit the pulsations imparted thereby by the valve device, and such cooler air also has a slight cooling effect on the engine.

An auxiliary fan may also be used to provide a positive pressure at the inlet orifice to the valve device, thereby making the valve device more sensitive to vacuum demand. This may be particularly benefician when the engine is operated at higher altitudes, to assist the valve device in performing the same way as it normally would at lower elevations.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DESCRIPTION OF THE DRAWINGS

In the annexed drawings:

FIG. 1 is a schematic illustration showing a preferred form of valve and supplemental air supply system in accordance with this invention connected to an internal combustion engine;

FIG. 2 is an enlarged fragmentary longitudinal section through the valve device of FIG. 1, showing the valve device in its closed condition when the engine is not running;

FIG. 3 is a fragmentary longitudinal section of the valve device, similar to FIG. 2, but showing the normal open condition of the valve during substantially all operating modes, except deceleration;

FIG. 4 is a fragmentary longitudinal section through the valve device, similar to FIG. 3, but showing a more restricted flow path through the valve to reduce the flow of air during deceleration;

FIG. 5 is a schematic illustration of a carburetor, in longitudinal section, showing the location of the inlet to the carburetor for the air pulsations from the valve device in close proximity to the carburetor idle jets;

FIG. 6 is a transverse section through the carburetor of FIG. 5, as seen from the plane of the line 6—6 thereof;

FIG. 7 is a schematic illustration showing such valve device mounted immediately adjacent the carburetor, with an air supply hose leading from the valve inlet to the front bulkhead to provide a supply of cooler air to the valve device; and FIG. 8 is a schematic illustration of a modified form of valve device, similar to the valve device of the previous Figures, but including an auxiliary fan attached thereto.

DESCRIPTION OF THE PREFERRED EMBODIMENTS

Referring now in detail to the drawings and initially to FIG. 1, there is shown by way of illustration a conventional automobile internal combustion engine 1 and a preferred form of supplemental air supply system 2 including a valve 3 connected thereto. The valve and system are designed for use with a gasoline engine to which an air/fuel mixture is supplied by a carburetor 4, and is not suitable for diesel or fuel injection engines.

As clearly shown in FIGS. 2 through 4, the valve may consist of a unitary Tee-shape plastic body 6 including a hollow cylindrical portion 7 and oppositely extending tubular arms 8, 9. Threadedly adjustably received within such cylindrical body portion is a tubular casing 12 having a cylindrical chamber 13 therein for receipt of three spherical balls 16, 17, 18, each of a diameter slightly less than the inner diameter of the cylindrical chamber. Adjacent the outer end 19 of the cylindrical chamber is a valve seat 20 suitably conically tapered at 21 to provide a valve seat for the adjacent spherical ball 16 which acts as a spherical valve member to provide a more positive seal when the engine is not running and the valve is in the closed position shown in FIG. 2. The conical valve seat also assists in providing better response for increased resonation of the balls during operation, as will be described more fully hereafter.

Communication with the interior of the cylindrical chamber 13 is through a narrow inlet orifice 25 in the outer end of the tubular casing and a similarly narrow outlet orifice 26 in the cylindrical body portion 6. An O-ring seal 23 is interposed between an annular flange 24 on the tubular casing 12 and the adjacent end of the plastic body 6 to prevent air from entering the valve device except through the narrow entry orifice 25. As shown in FIG. 2, an enlarged cup-shape extension 27 may be formed as an integral molded part on the outer end of the tubular casing 12 for receipt of an air filter 28 to permit fresh filtered air to pass directly into the valve. The filter 28 is quite large relative to the inlet orifice to the valve to permit the valve device to be used for longer periods of time without cleaning or changing the filter. Suitable cooling fins 30 may also be integrally molded as a part of the tubular casing, running substantially the full exterior length thereof.

Within the cylindrical chamber 13 adjacent the end opposite the valve seat 20 is a frustoconical serrated washer 31 supported by an annular shoulder 32 on the cylindrical body portion 7 surrounding the outlet orifice 26 therein. The washer has a circular central opening 33 of a diameter less than the diameter of the spherical balls and a plurality of outer peripheral notches 34. Rotating the casing 12 relative to the body 7 will cause the casing to move axially in or out to move the valve seat 20 toward and away from the washer 31 to vary the length of the chamber 13 containing the balls and thereby subject the latter to a predetermined degree of compression. Such casing may be suitably resisted in its turning movement, to prevent undesirable rotation due to vibrations and the like, as by providing a pair of arms 40, 41, which may be molded as an integral part of the cylindrical body portion, extending outwardly from opposite sides thereof, and having inwardly facing extensions 42, 43 suitably notched at 44, for engagement with a notched flange 45 on the outer end of the cup-shape extension 27. The arms 40, 41, being made of plastic, are sufficiently flexible to permit a ratchet effect to occur between the notches 44 and notched flange 45 when a suitable torque is applied to the casing to permit turning. Suitable indicia may also be provided on the notched flange 45, as an aid in such valve adjustment. A stop shoulder 46 on one or both of the arm extensions 42, 43 extends radially inwardly of the outer periphery of the flange to limit the amount of valve adjustment and prevent the valve from being disassembled except by applying enough force to spread the arms sufficiently apart to free the casing flange from engagement with the stop shoulder because of the possibility of losing one or more of the spherical members, or of altering their preferred order of placement as described hereafter.

The outlet passage 50 from the valve device desirably includes a right angle turn formed as by providing a longitudinal extending passage 51 in the body cross member 52 intersecting at a right angle the outlet orifice 26 in the central leg portion 7 of the body 6. One end of the longitudinal passage 51 communicates with a swirl chamber 53 at one end of the cross member formed as by providing a counterbore 54 in such one end, with a plug 55 inserted in the outer end thereof. The other end of the cross member also has a counterbore 56 therein for receipt of a tubular delivery line 57 to provide communication between the valve outlet 58 and the engine carburetor 4.

The valve body 6 and casing 13 are desirably made of a suitable plastic material such as nylon or Celcon which will not deteriorate under warm or humid operating conditions in the presence of oil and gasoline fumes. The balls 16, 17 and 18 are also made of a suitable plastic material which will withstand the temperature ranges to which the balls are subjected without adversely affecting the operation of the balls. When properly adjusted, the valve member 16 will be unseated due to changes in pressure caused by the engine vacuum acting on the valve through the air delivery line, and the balls 16, 17, 18 will vibrate at resonance over the entire operating range of the engine, creating shock waves in the air stream passing through the valve into the engine.

By making the balls 16, 17, 18 of different hardnesses, better control of the supplemental air flow to the engine may be obtained. The main resonating effect occurs at the spherical valve member 16 which engages the valve seat 20 and allows small amounts of metered air to pass through when required. Because the valve is responsive to the engine vacuum, making the spherical valve member 16 of a semi-hard material and providing a conical valve seat 20 therefor makes the spherical valve member more responsive to lower engine vacuums and provides increased resonation during all modes of operation. The semi-hard spherical valve member engaging the conical valve seat also provides a more positive seal, completely sealing off the valve, when the engine is not running to keep out moisture. Minute dust particles and the like in the air will not allow air seepage through the valve when closed as they might if the material of the spherical valve member were too hard.

The hardness of the ball member 18 furthest removed from the spherical valve member 16 is preferably somewhat less, whereby during deceleration the high vacuum developed in the manifold will cause the ball member 18 to be compressed and bulge laterally more than the other two balls, as shown in FIG. 4, to such an extent to restrict somewhat the supplemental air flow through the valve during deceleration. As the vacuum drops off, the tendency of the ball member 18 to spring back to its original shape positively urges the intermediate ball 17 against the spherical valve member 16 tending to close the orifice. The intermediate ball 17 is preferably of a much harder material than the other two balls 16, 18, acting as a piston therebetweem to provide instant response between the other two balls and promote high frequency pulsations of the device.

As indicated previously, the narrow entry and exit orifices 25, 26 have the effect of reducing the air flow through the device while at the same time increasing the velocity of the air pulsations so that the pressure wave generated by the balls is not lost as the air exits from the device. The amount of air flow through the device may also be reduced by reducing the clearance between the balls 16, 17, 18 and chamber wall 60. Such air flow through the device may of course be varied within limits by rotating the casing 12 relative to the body 7 to vary the preload on the balls in the manner previously described. The valve may, for example, be set to provide approximately 90 standard cubic feet per hour of air to a standard eight cylinder 383 cubic inch engine with lean set carburetor. Such an engine receives approximately 200 standard cubic feet per minute of primary air flow through the carburetor at idle. If the carburetor is set to provide a richer mixture, the setting of the valve should be changed to supply more supplemental air. For smaller engines, the supplemental air flow supplied by the valve should be reduced.

During initial startup, when the engine is first cranked, the chamber 53 in the valve device acts as a delay chamber, to assist in delaying opening of the valve device until after the engine has started. This has the advantage that the air fuel mixture entering the engine is temporarily rich to promote easy starting.

When the engine is running, the valve device will remain open, and the air flow through the device will be substantially the same over the full operating range of the engine except during high deceleration as aforesaid. The frequency of the air pulsations created by the ball movements will vary over a broad range under different driving modes, for example, from a frequency of about 1500 cycles per second which will dominate at the higher air flow rates during cruising conditions, and a frequency of about 520 cps which will dominate at the lower air flow rates during idle and deceleration. The harmonics will also change during different driving modes.

As soon as the engine starts running, the balls 16, 17, 18 begin to resonate, creating shock waves in the air stream passing through the valve device into the carburetor. The injection of additional pulsating air into the carburetor 4 and manifold 61 increases the turbulence of the fuel/air mixture and thoroughly mixes the required amount of air with the fuel at the critical point within the engine for improved combustion and fast response at substantially all engine speeds. The outer peripheral notches 34 in the washer 31 also create a swirling action of the air passing through the valve, whereby the air enters the carburetor and manifold in sonic waves combined with a swirling motion for increased turbulence.

The right angle turn in the exit path 26, 51 from the valve device and the oppositely extending chamber 53 also assist in causing the balls to resonate over a greater range. The velocity of the air pulsations entering the carburetor may also be increased by using a plastic tube having a small ID for the air delivery line 57. The shorter the air delivery line, the greater the pressure wave will be as it enters the carburetor.

In theory, the closer the valve device is to the carburetor the better. However, the valve device must either be located in a position where it will not be subjected to excessive heat, for example, on the front bulkhead, or in another cool section of the engine compartment, requiring the use of a fairly long delivery line as shown in FIG. 1, or if mounted much closer to the carburetor as shown in FIG. 7, a larger diameter air hose 65 must be provided from the front bulkhead to the valve inlet (air filter cup 27) to provide a supply of cooler air to the device. The cooler air will of course prevent the valve device from becoming too hot, and will also have somewhat of a cooling effect on the engine. The cooler air is also more dense, thereby better able to transmit the pulsations imparted thereto by the valve device. Also, of course the closer the valve device is to the carburetor, the shorter the distance the pulsations have to travel, and thus the less diminished they become.

The valve device is also better able to sense barometric changes or changes in outside air temperature if the valve itself or at least the air supply line for the valve is adjacent the front bulkhead, making the valve device sensitive to changes in air density and temperature as well, to assist in maintaining the air/fuel ratio substantially constant over the full operating range of the engine despite changes in air pressure and temperature.

It has also been found that if the inlet 66 to the carburetor 4 through which the air pulsations from the valve device 3 are introduced is in close proximity to the carburetor idle gas jets 67 beneath the throttle plate 68 as shown in FIGS. 5, 6 and 8, better atomization of the fuel droplets and more uniform mixing of the air and gas particles is obtained, not only in the carburetor, but throughout the manifold 61 and into the engine cylinders themselves, giving more even distribution of the air/fuel mixture to the various cylinders resulting in better fuel combustion. Because the secondary and main carburetor jets (not shown) are above or exterior of the throttle plate 68, the air inlet 66 from the valve device is not in close proximity to them. Nevertheless, the air/fuel mixture from these jets flows down past the pulsating air inlet 66 to the carburetor, whereby the air pulsations promote remixing and atomizing of the fuel and air where they start to separate. Also, because of the location of the air inlet 66 into the carburetor below the throttle plate 68, the incoming air pulsations tend to eliminate any low pressure areas beneath the throttle plate which might otherwise occur at partial throttle.

Although the dimensions of the various valve parts may be varied to generate different air flow rates and different magnitudes of air pulsations from the valve, the balls 16, 17, 18 are each preferably approximately ⅛ inch in diameter. The inner diameter of the cylindrical chamber 13 is slightly greater than the diameter of the balls, for example, 15 to 30 hundredths of an inch greater. Also, the entry orifice 25 is desirably approximately ⅛ inch in diameter, and the exit orifice 26, intersecting the flow path 51 in the body portion 6, and the air delivery line 15 from the valve device to the carburetor are preferably approximately 13/64 inch in diameter. The diameter of the swirl chamber 53 in the body portion 6 is approximately ⅜ inch.

The spherical valve member 16 is preferably made of a suitable thermosetting polyurethane material having a hardness of approximately 89 on the Shore scale. The ball 18 is preferably made of the same material but having a hardness somewhat less, for example, 0.5 less or approximately 88.5 on the Shore scale when the spherical valve member has a hardness of 89. The intermediate ball 17 is preferably made of a much harder material such as nylon, teflon, or Celcon, having little or no resilience.

For best results, the valve device should preferably be adjusted with the aid of an emission analyzer to set the valve device at the crossover point at which the CO and HC emissions from the engine are the lowest. When properly adjusted, the valve will deliver a substantially constant pulsating air flow over substantially the full operating range of the engine, for example, 25 to 30 standard cubic feet per hour for small European engines, 30 to 40 scfh for engines with emission control carburetors, and 90 to 120 scfh for the largest pre-emission control engines. This insures that the air/fuel ratio setting of the carburetor, whatever it may be, is maintained substantially constant within a narrow band, for example, 14.6 to 1, plus or minus 0.1% over all driving modes.

An internal combustion engine must maintain the proper fuel/air ratio in order to achieve maximum power output or the best fuel economy compatible with the lowest possible emissions. Generally, this coincides with the air/fuel ratio at which catalytic mufflers also operate at their maximum efficiency. In actual tests, it has been possible to substantially zero out CO and substantially eliminate hydrocarbons from the emissions using the valve device with an engine equipped with a catalytic muffler. The CO and HC emissions from the engine with the catalytic muffler but without the valve device were about 0.090 grams per mile CO and 0.050 grams per mile HC. With the valve device, the CO was reduced to zero and the hydrocarbons were reduced to about 0.040 grams per mile. In other tests, with the valve device but without the catalytic converter, the CO and hydrocarbons were reduced from about 30 to 40 grams per mile CO and 1.5 to 2.5 grams per mile HC to about 4.6 to 5 grams per mile CO and about 0.8 to 1.0 grams per mile HC.

The leaner the setting of the carburetor, the less supplemental pulsating air should be supplied by the valve device into the fuel and air path of the engine in order to maintain the desired air/fuel ratio within a narrow band over substantially all driving modes. When richer air/fuel mixtures are being supplied to the engine, as they are in older cars, for best results, the amount of supplemental pulsating air supplied by the valve device should be increased as by adjusting the setting of the valve device to increase the air flow therethrough.

In FIG. 8 there is shown a modified form of valve device 31 in accordance with this invention which is substantially the same as the valve device previously described, and the same reference numerals followed by a prime symbol are used to designate like parts. In addition, however, there is provided an auxiliary fan 70 exteriorly of the valve to establish a positive pressure at the entry orifice 25' to the valve. Such an auxiliary fan makes the valve more sensitive to vacuum demand, and in actual tests, it has been found that the valve with fan operating results in a further reduction in emissions, with consequent increased power and better fuel economy. The fan, which acts as a turbocharger, is desirably placed as close as possible to the valve inlet, as by mounting the same directly to the outer end 71 of the tubular casing 12' exteriorly of the filter 28'. Such a valve-fan combination has been found particularly beneficial in obtaining better engine performance when ascending hills or when the engine is operated at high elevations, the fan providing a positive pressure at the inlet orifice.

Although the invention has been shown and described with respect to a preferred embodiment, it is obvious that equivalent alterations and modifications will occur to others skilled in the art upon the reading and understanding of this specification. The present invention includes all such equivalent alterations and modifications and is limited only by the scope of the claims.

The embodiments of the invention in which an exclusive property or privilege is claimed are defined as follows:

1. In combination with an internal combustion engine having an intake manifold and carburetor, pressure responsive valve means for supplying a substantially constant pulsating air flow to said carburetor over substantially the full operating range of the engine, said carburetor including a throttle plate, and gas idle jets beneath said throttle plate, said carburetor having an inlet for such pulsating air beneath said throttle plate in close proximity below said gas idle jets, whereby such pulsating air creates turbulence in the air flow entering said carburetor and manifold resulting in shock waves which assist in breaking up the fuel into smaller, more uniform particle sizes, and maintaining a substantially constant air/fuel mixture which is supplied to each of the engine cylinders over such operating range.

2. The combination of claim 1 wherein said valve means is mounted closely adjacent said carburetor, and an air hose extends from the inlet to said valve means away from said engine to provide a supply of cooler air to said valve means.

3. The combination of claim 1 wherein said valve means comprises a valve chamber having an inlet and an outlet, and three spherical members within said chamber intermediate said inlet and outlet, said spherical members being positioned within said valve chamber to resonate over substantially the full operating range of said engine to supply such substantially constant pulsating air flow over such operating range, said inlet having a valve seat engageable by one of said spherical members, said one spherical member being made of a semi-hard material to provide better response at lower engine vacuums.

4. The combination of claim 3 wherein said valve seat has a conical taper for engagement by said one spherical member to provide a positive seal completely sealing off said valve means when said engine is not running.

5. The combination of claim 3 wherein said spherical members are in stacked relation in said valve chamber, and the spherical member furthest from said one spherical member is somewhat less hard than said one spherical member and resiliently deformable under high engine vacuums to somewhat reduce the pulsating air flow through said valve means during deceleration when the engine vacuum is high.

6. The combination of claim 5 wherein the spherical member intermediate the other two spherical members is of a harder material and acts as a piston between the other two spherical members to provide instant response therebetween and promote high frequency air pulsations.

7. The combination of claim 6 wherein said furthest spherical member positively urges the intermediate spherical member against said one spherical member after high engine vacuum as the engine vacuum drops off.

8. The combination of claim 3 wherein said inlet and outlet to said valve chamber are relatively narrow orifices to restrict the air flow through said valve means.

9. The combination of claim 8 further comprising an air delivery line between said outlet from said valve means and said inlet to said carburetor, said air delivery line having a relatively small inner diameter to maintain the velocity of the air pulsations during transmittal from said valve means to said carburetor.

10. The combination of claim 9 wherein the length of said air delivery line is relatively short so as to substantially maintain the magnitude of such air pulsations during transmittal from said valve means to said carburetor, and there is an air hose extending from said inlet to said valve means away from said engine to a cooler section of the engine compartment to provide a supply of cooler air to said valve means.

11. The combination of claim 1 further comprising fan means for providing a positive pressure to said valve means.

12. In combination with an internal combustion engine having an intake manifold and carburetor, pressure responsive valve means for supplying a substantially constant pulsating air flow to said engine over substantially the full operating range thereof, said valve means comprising a valve chamber having an inlet and an outlet, and three spherical members in stacked relation within said chamber intermediate said inlet and outlet, said spherical members being responsive to vacuum pressure at said outlet to produce a substantially constant pulsating air flow at said outlet, said inlet having a valve seat engageable by one of said spherical members, said one spherical member being made of a semi-hard material to provide better response at lower vacuum pressures at said outlet, the spherical member furthest removed from said one spherical member being somewhat softer and resiliently deformable under high vacuum pressure at said outlet to reduce the pulsating air flow through said valve during such conditions of high vacuum pressure at said outlet, and the spherical member intermediate the other two spherical members being of a harder material to act as a piston between the other two spherical members to provide instant response therebetween and promote high frequency air pulsations through said valve.

13. The combination of claim 12 wherein said valve seat is conically tapered, and said one spherical member forms a positive seal with said valve seat completely sealing off said valve when there is no vacuum pressure at said outlet.

14. The combination of claim 12 wherein said valve means is mounted closely adjacent said carburetor, and an air hose extends from the inlet to said valve means away from said engine to provide a supply of cooler air to said valve means.

15. The combination of claim 12 further comprising fan means for providing a positive pressure at the inlet to said valve means.

16. A valve including a valve chamber having an inlet and an outlet, and three spherical members within said chamber intermediate said inlet and outlet, said spherical members being responsive to vacuum pressure at said outlet to produce a substantially constant pulsating air flow at said outlet, said inlet having a valve seat engageable by one of said spherical members, said one spherical member being made of a semi-hard material to provide better response to small vacuum pressure at said outlet.

17. The valve of claim 16 wherein said valve seat is conically tapered, and said one spherical member forms a positive seal with said valve seat completely sealing off said valve when there is no vacuum pressure at said outlet.

18. The valve of claim 16 wherein said spherical members are in stacked relation in said valve chamber, and the spherical member furthest removed from said one spherical member is somewhat softer and resiliently deformable under high vacuum pressure at said outlet to reduce the pulsating air flow through said valve during such conditions of high vacuum pressure at said outlet.

19. The valve of claim 18 wherein the spherical member intermediate the other two spherical members is of a harder material to act as a piston between the other two spherical members to provide instant response therebetween and promote high frequency air pulsations through said valve.

20. The valve of claim 19 wherein said furthest spherical member positively urges the intermediate spherical member against said one spherical member after high vacuum pressure at said outlet as the vacuum pressure at said outlet drops off.

21. The valve of claim 19 wherein said inlet and outlet to said valve chamber are relatively narrow orifices to restrict the air flow through said valve.

22. The valve of claim 21 wherein the clearance space between said spherical members and the wall of said valve chamber is relatively small to restrict the air flow through said valve.

23. The valve of claim 16 wherein said outlet includes a right angle turn, and there is a further chamber in said valve communicating with said right angle turn extending in the opposite direction therefrom to delay opening of said valve and promote resonation of said spherical members.

24. The valve of claim 16 wherein said valve chamber comprises two cylindrical portions threadedly axially connected together for relative rotation to vary the longitudinal extent of said valve chamber, further comprising means for restricting such relative rotation of said cylindrical portions to prevent inadvertent turning due to vibrations and the like, and stop means for limiting the extent to which said cylindrical portions may be moved axially apart to prevent accidental disassembly of said cylindrical portions.

25. The valve of claim 24 wherein said inlet is in one of said cylindrical portions and said outlet is in the other cylindrical portion, and there is an enlarged cup-shape extension on the cylindrical portion containing said inlet, and an air filter in said cup-shape extension for removing dirt particles from the entering air.

26. The valve of claim 24 wherein said cylindrical portions are molded of plastic, and said means for resisting such relative rotation of said cylindrical portions comprises a pair of arms molded as an integral part of one of said cylindrical portions and extending outwardly from opposite sides thereof, said arms having inwardly facing extensions, with notches therein, and said other cylindrical portion having a notched flange engageable by said notched extensions, said arms being sufficiently flexible to permit said other cylindrical portion to be rotated relative to said arms upon application of a turning torque thereto.

27. The valve of claim 26 wherein said other cylindrical portion has an enlarged cup-shape extension molded as an integral part thereof, said cup-shape extension containing an air filter for removing dirt particles from the entering air, said notched flange being an integral part of said cup-shape extension.

28. The valve of claim 27 further comprising an air hose extending from said cup-shape extension to provide a supply of cooler air to said valve.

29. The valve of claim 16 further comprising a fan attached to said valve adjacent said inlet to provide a positive pressure at said inlet.

30. A valve including a valve chamber having an inlet and an outlet, and three spherical members in stacked relation within said chamber intermediate said inlet and outlet, said spherical members being responsive to vacuum pressure at said outlet to produce a substantially constant pulsating air flow at said outlet, said inlet having a valve seat engageable by one of said spherical members, said valve seat being conically tapered, and said one spherical member being made of a semi-hard material to provide better response at lower vacuum pressures at said inlet, the spherical member furthest removed from said one spherical member being slightly softer and resiliently deformable under high vacuum pressure at said outlet to reduce the pulsating air flow through said valve during such conditions of high vacuum pressure at said outlet, and the spherical member intermediate the other two spherical members being of a harder material to act as a piston between the other two spherical members to provide instant response therebetween and promote high frequency air pulsations through said valve.

31. The valve of claim 30 wherein said valve chamber comprises two cylindrical portions threadedly axially connected together for relative rotation to vary the longitudinal extent of said valve chamber, further comprising means for restricting such relative rotation of said cylindrical portions to prevent inadvertent turning due to vibrations and the like, and stop means for limiting the extent to which said cylindrical portions may be moved axially apart to prevent accidental disassembly of said valve.

32. The valve of claim 30 further comprising a fan attached to said valve adjacent said inlet to provide a positive pressure at said inlet.

33. A valve including a valve chamber having an inlet and an outlet, and a plurality of spherical members within said chamber intermediate said inlet and outlet, said spherical members being responsive to vacuum pressure at said outlet to produce a substantially constant pulsating air flow at said outlet, said inlet having a valve seat engageable by one of said spherical members, and a fan attached to said valve adjacent said inlet to provide a positive pressure at said inlet.

* * * * *